(12) United States Patent
Pang et al.

(10) Patent No.: US 7,297,914 B2
(45) Date of Patent: Nov. 20, 2007

(54) CERENKOV X-RAY DETECTOR FOR PORTAL IMAGING

(75) Inventors: Geordi G. Pang, Markham (CA); John A. Rowlands, Toronto (CA)

(73) Assignee: Sunnybrook Health Sciences Centre, Toronto (CA)

( * ) Notice: Subject to any disclaimer, the term of this patent is extended or adjusted under 35 U.S.C. 154(b) by 0 days.

(21) Appl. No.: 11/649,362

(22) Filed: Jan. 4, 2007

(65) Prior Publication Data
US 2007/0164225 A1 Jul. 19, 2007

Related U.S. Application Data

(60) Provisional application No. 60/759,571, filed on Jan. 18, 2006.

(51) Int. Cl.
*G01T 1/24* (2006.01)
(52) U.S. Cl. ............ 250/207; 250/370.09; 250/370.14
(58) Field of Classification Search ................ 250/207, 250/370.09, 370.14; 378/62, 63
See application file for complete search history.

(56) References Cited

U.S. PATENT DOCUMENTS

| | | | | |
|---|---|---|---|---|
| 5,082,340 A | * | 1/1992 | Aoshima et al. ............ 359/328 |
| 5,962,856 A | * | 10/1999 | Zhao et al. ............ 250/370.09 |
| 6,052,432 A | * | 4/2000 | Rieppo et al. ............ 378/98.2 |
| 6,828,575 B2 | * | 12/2004 | Luo et al. ................ 250/493.1 |
| 7,030,386 B2 | * | 4/2006 | Pang et al. ............ 250/370.14 |
| 2006/0054835 A1 | * | 3/2006 | Rowlands et al. .......... 250/371 |

OTHER PUBLICATIONS

A review of electronic portal imaging devices (EPIDS), pp. 1-16, Med. Phys. 19(1), Jan./Feb. 1992, Boyer et al.

* cited by examiner

*Primary Examiner*—John R. Lee
(74) *Attorney, Agent, or Firm*—Lynn C. Schumacher; Hill & Schumacher

(57) ABSTRACT

The present invention provides a practical design of a megavoltage x-ray detector with both high quantum efficiency (QE) and high resolution. The x-ray detector includes an optical-fiber taper (OFT) made from a large number of optical fibers, each of which is aligned with the incident x-rays from an x-ray source hitting a top surface of the optical fiber taper. The optical-fiber taper is a matrix of optical fibers with the core material made of, e.g., silica and coated with a cladding glass or polymer such that light created within the core of each optical fiber will be guided to the bottom ends of the fiber with the ends of the fibers at the bottom being optically coupled to and optical image read-out device. Each optical fiber in the optical fiber taper is fully aligned with the incident x-ray source so that x-rays entering the top of the fiber travel directly towards the bottom of the same fiber. This alignment (or focusing) of the optical-fiber taper towards the x-ray source can be achieved by an extra coating at the bottoms of the optical fibers so they have a larger diameter than the other top ends of the fibers.

18 Claims, 3 Drawing Sheets

CERENKOV X-RAY DETECTOR FOR PORTAL IMAGING

CROSS REFERENCE TO RELATED U.S PATENT APPLICATION.

This patent application relates to U.S. provisional patent application Ser. No. 60/759,571 filed on Jan. 18, 2006 entitled CERENKOV X-RAY DETECTOR FOR PORTAL IMAGING, filed in English, which is incorporated herein in its entirety by reference.

FIELD OF THE INVENTION

The present invention relates generally to improved electronic portal imaging devices (EPIDs) used in radiation therapy, and more particularly the present invention relates to a high quantum efficiency (QE) x-ray detector based on Cerenkov radiation (or Cerenkov light) for portal imaging application.

BACKGROUND OF THE INVENTION

Electronic portal imaging devices (EPIDs) are important tools for treatment verification in Radiation Therapy. Most EPIDs developed so far for portal imaging application [using megavoltage (MV) x-rays] use a Cu plate/phosphor screen to absorb x-rays and convert their energies into light, and the light image is then read out by different ways depending on the design of a given EPID [see L. Boyer et al., "A review of electronic portal imaging devices (EPIDs)," Med. Phys. 19,1-16(1992)]. The main problem with this approach is that the Cu plate/phosphor screen must be thin (~2 mm thick) in order to obtain a high spatial resolution, resulting in a low x-ray absorption or low quantum efficiency (QE), which is typically on the order of 2-4% as compared to the theoretical limit of 100%.

Therefore, it would be very advantageous to provide an x-ray detector with both the quantum efficiency and spatial resolution that can be used for portal imaging applications including megavoltage cone beam computed tomography (MVCT).

SUMMARY OF THE INVENTION

An objective of the present invention is to provide a practical design of a megavoltage x-ray detector with both high QE and high resolution. In accordance with the present invention, the x-ray detector disclosed herein has a QE that can be an order of magnitude higher than that of current EPIDS and yet has an equivalent spatial resolution.

The present invention provides an x-ray detector that uses Cerenkov radiation to convert x-ray energies into light for portal imaging applications. The x-ray detector disclosed herein has a QE that can be more than 80% and yet has a spatial resolution equivalent to that of current EPIDs. The detective quantum efficiency (DQE) at the zero frequency can also be as high as 40%, which is over 20 times higher than that of current EPIDs. In addition, the optical light guides forming the detector of the present invention are made of low-atomic number materials, a potential advantage for transit dosimetry in radiation therapy.

The present invention provides an x-ray detector, comprising:

a) a plurality of optical light guides each having an optical core made of a dielectric material, each of the plurality of optical light guides having a length and opposed first and second ends, said plurality of optical light guides being aligned and bonded together along the length of said optical light guides to form an optical light guide taper with said optical light guides being bonded in such a way that the first ends of said plurality of optical light guides are aligned adjacent to each other to form a top surface, and the second ends of said plurality of optical light guides are aligned adjacent to each other to form a bottom surface, and each optical light guide in said optical light guide taper is aligned with an x-ray source spaced from said top surface in such a way that the optical light guide taper is tapered from said top surface to said bottom surface such that when located with respect to an x-ray source, each optical light guide is aligned with the x-ray source in such a way that x-rays entering a selected optical light guide at its first end can travel directly through said selected optical light guide towards the second end of said selected optical light guide; and b) optical image readout device optically coupled to said bottom surface, wherein x-rays entering said selected optical light guide which interact with the dielectric material by Compton scattering or pair-production processes produces energetic electrons having velocities greater than the speed of light in said dielectric material which produces Cerenkov light photons, and wherein Cerenkov light photons emitted in a forward direction in said selected optical light guide is guided by the selected optical light guide to said optical image readout device, and wherein a spatial variation of light output across the bottom surface produces an optical image which can be read out by the optical image readout device.

BRIEF DESCRIPTION OF THE DRAWINGS

Preferred embodiments of the invention will now be described, by way of example only, with reference to the drawings, in which.

DETAILED DESCRIPTION OF THE INVENTION

Generally speaking, the systems described herein are directed to a detector for portal imaging. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to a detector for portal imaging.

As used herein, the term "about", when used in conjunction with ranges of dimensions, temperatures or other physical properties or characteristics is meant to cover slight variations that may exist in the upper and lower limits of the ranges of dimensions so as to not exclude embodiments where on average most of the dimensions are satisfied but where statistically dimensions may exist outside this region. For example, in embodiments of the present invention dimensions of components of the x-ray detector are given but it will be understood that these are not meant to be limiting.

Figure 1:
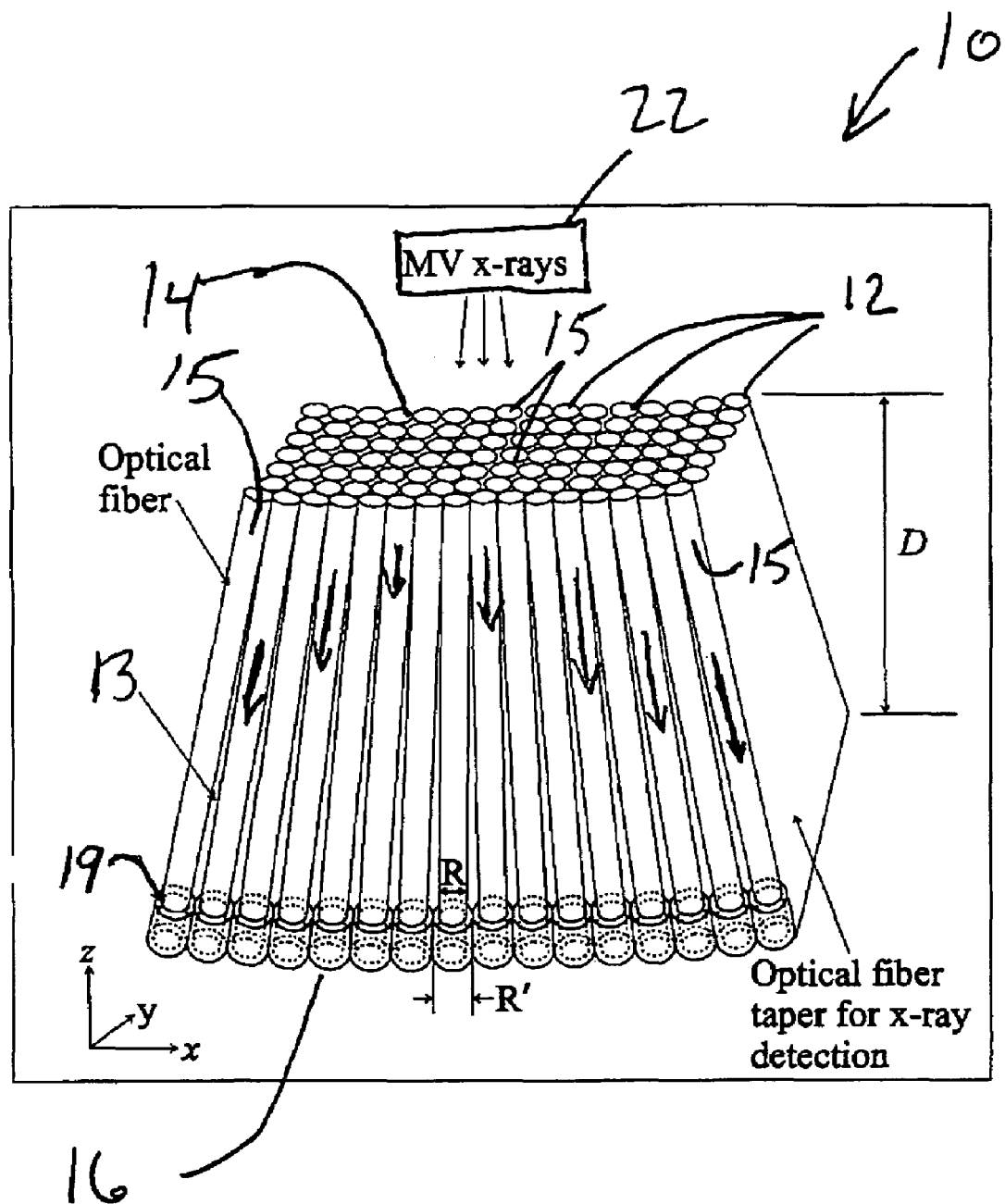
FIG. 1 shows a schematic 3D view of the optical-fiber taper (OFT) for MV x-ray detection constructed in accordance with the present invention.
Figure 2:
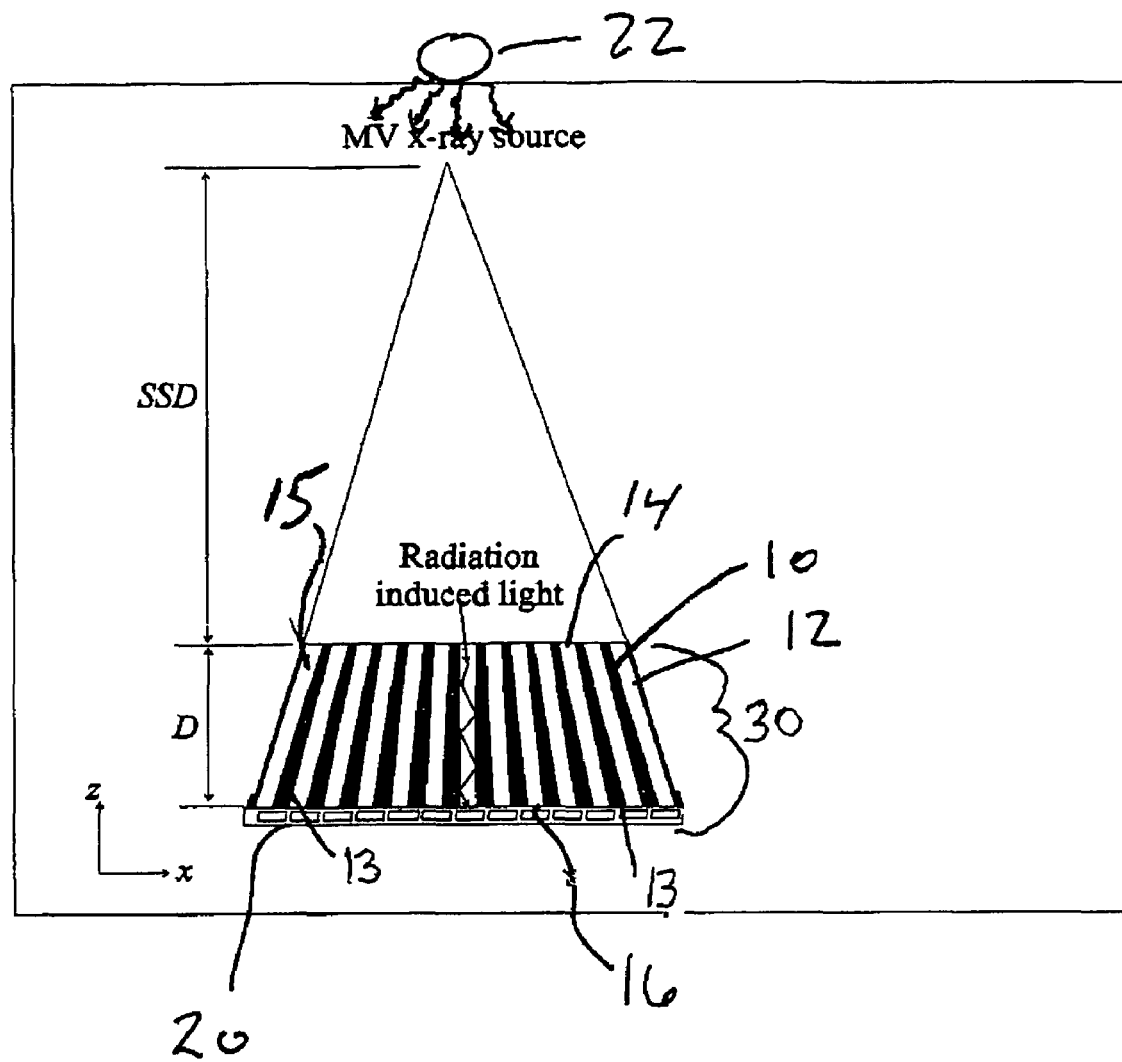
FIG. 2 shows a small cross-section of detector of the present invention comprised of an optical-fiber taper (for x-ray detection) optically coupled to an optical image readout device (for image readout)

Referring to FIG. 1, a schematic 3D view of the optical light guide taper for MV x-ray detection system is shown generally at 10 for detecting megavoltage (MV) x-rays in a detector 30 shown in FIG. 2 formed by the combination of the optical light guide taper 10 and an optical image readout device 20. The optical-fiber taper includes a plurality of optical light guides 12 (preferably optical fibers so that the optical light guide taper is an optical fiber taper (OFT)) each of which is aligned with the incident x-rays. The number of optical fibers 12 used will depend on the desired size of the detector and the diameter of the optical fibers used. The gap 13 between fibers 12 can be filled with, e.g., a black epoxy resin or glass. The optical-fiber taper (OFT) 10 preferably has a large detection surface area, a typical size would be (~40 cm ×40 cm) and thick (~a few centimeter to a few tens centimeter thick) depending on the desired quantum efficiency (QE).

The optical-fiber taper 10 is a matrix of optical fibers 12 with the core 15 material made of, e.g., silica and coated with a cladding glass or polymer such that light created within the core 15 of each optical fiber 12 will be guided to the top and the bottom ends of the fiber 12. The numerical aperture of each fiber 12 should be high to improve the light collection efficiency and thus improve the detective quantum efficiency (DQE).

Referring to FIG. 2 showing the detector 30 according to the present invention, at the bottom surface 16 of the optical-fiber taper 10, the surface of each optical fiber 12 is preferably uncoated which allows the light to emerge and be detected in the optical image read-out device 20 which is optically coupled to the bottom surface 16 of the optical fiber taper 10. At the top surface 14 of the optical-fiber taper 10, the surface of each fiber 12 can be either uncoated or coated. When the surface 14 is coated with a reflective or scattering material, a small amount of emerging light at the top will be returned back into the fiber and then back to the sensor or optical read-out device 20.

Referring again to FIG. 2, in order to avoid blur due to the oblique incidence of off-axis x-rays, each optical fiber 12 is fully aligned with the incident x-ray source 22 so that x-rays entering the top of the fiber 12 travel directly towards the bottom of the same fiber as shown in FIG. 2. This alignment (or focusing) of the optical-fiber taper 10 towards the x-ray source 22 can be achieved by an additional coating at the bottom of the otherwise-uniform fibers 12 as shown in FIG. 1. An extra coating 19 on the bottom of the fibers 12 produces more space between fibers 12 at the bottom of the taper 10 so that tops of the fibers 12 at the top of the taper 10 are closer to each other than that at the bottom of taper 10, shown in FIG. 1. Since the x-ray beam is a cone beam and it spreads out as it leaves the x-ray source 22, the fibers 12 with the additional coating at the bottom of the taper 10 spread out in the same way as the x-ray beam, best seen in FIG. 2. Thus, x rays entering the top of the fiber 12 travel towards the bottom of the same fiber, i.e., the fiber 12 is focused towards the x-ray source 22.

The diameter (R) of each fiber 12 is preferably in the range from about ~100 μm to about 1000 μm, except for at the bottom of the taper where the diameter is R' (due to the additional coating). The ratio of R to R' depends on the source-to-detector-surface distance (SSD) as well as the detector thickness D (see FIG. 2) and is given by:

$$R/R' = SSD/(SSD+D). \tag{1}$$

For SSD=140 cm and D=30 cm, R/R'=0.82. The air gap 13 between optical fibers 12 can be filled with a black epoxy resin which acts as (1) an adhesive material to bond the fibers together; (2) a light-absorbing material may be used to absorb light which is not guided by the fibers but instead escapes from the sides of the fibers [generally referred to as EMA (extramural absorption)]. Once all optical fibers 12 are bonded together, the optical fiber taper 10 may be machined to the desired shape (i.e., making the top and bottom surfaces flat).

The present invention uses Cerenkov radiation to convert x-ray energies into light. Cerenkov radiation (or Cerenkov light) was discovered in 1926[ see J. V. Jelley, *Cerenkov Radiation and its applications* (Pergamon Press, London 1958)]. It is an electromagnetic "shock-wave" of light produced by a charge particle (such as a fast electron generated by megavoltage x-rays interacting with a detector) passing through a dielectric medium with a velocity greater than the speed of light in the medium.

In operation, with the optical fiber taper 10 optically coupled to the optical image readout device 20, when MV x-rays interact with the optical fiber taper 10, energetic electrons will be produced by Compton scattering or pair-production processes. Those electrons with velocities greater than the speed of light in the fiber material (=the speed of light in vacuum divided by the refractive index of the fiber material) will produce Cerenkov light photons along their paths. Most light photons are emitted in the forward direction. Those light photons produced in a fiber core and emitted within the acceptance angle of the optical fiber will be guided by the optical fiber towards the bottom surface of the optical fiber taper 10. Only a very small fraction of light photons can be emitted towards the top surface 14 of the optical fiber taper 10.

The spatial variation of light output from the bottom surface of the optical fiber taper 10 is an optical image, which can be read out by the optical image readout device 20. This optical image readout device 20 can be an optical image intensifier, a silicon photomultiplier (SiPM) or an optically sensitive 2D active readout matrix such as one previously used in indirect-conversion flat panel detectors [see, for example, J. A. Rowlands and J. Yorkston, "Flat panel detectors," in *Handbook of Medical Imaging*(SPIE, Bellingham 2000), Vol.1, pp 223-328].

In a preferred embodiment of this invention, the optical image readout device is an a-Se based optical detector [see, for example, G. Pang, W. Zhao, J. A. Rowlands, "Digital radiology using active matrix readout of amorphous selenium: Geometrical and effective fill factors", Med. Phys. 25, 1635-1646(1998)].

In a preferred embodiment, the a-Se layer in the a-Se based optical detector is operated in the avalanche mode to amplify the signal in order to overcome the electronic noise of the 2D active matrix [K. Tanioka, J. Yamazaki, K. Shidara, K. Taketoshi, T. Kawamura, T. Hirai, and Y. Takasaki, "Avalanche-mode amorphous selenium photoconductive target for camera tube", *Advances in Electronics and Electron Physics*, 74, 379-387(1988)] at all x-ray exposure levels.

Figure 3:
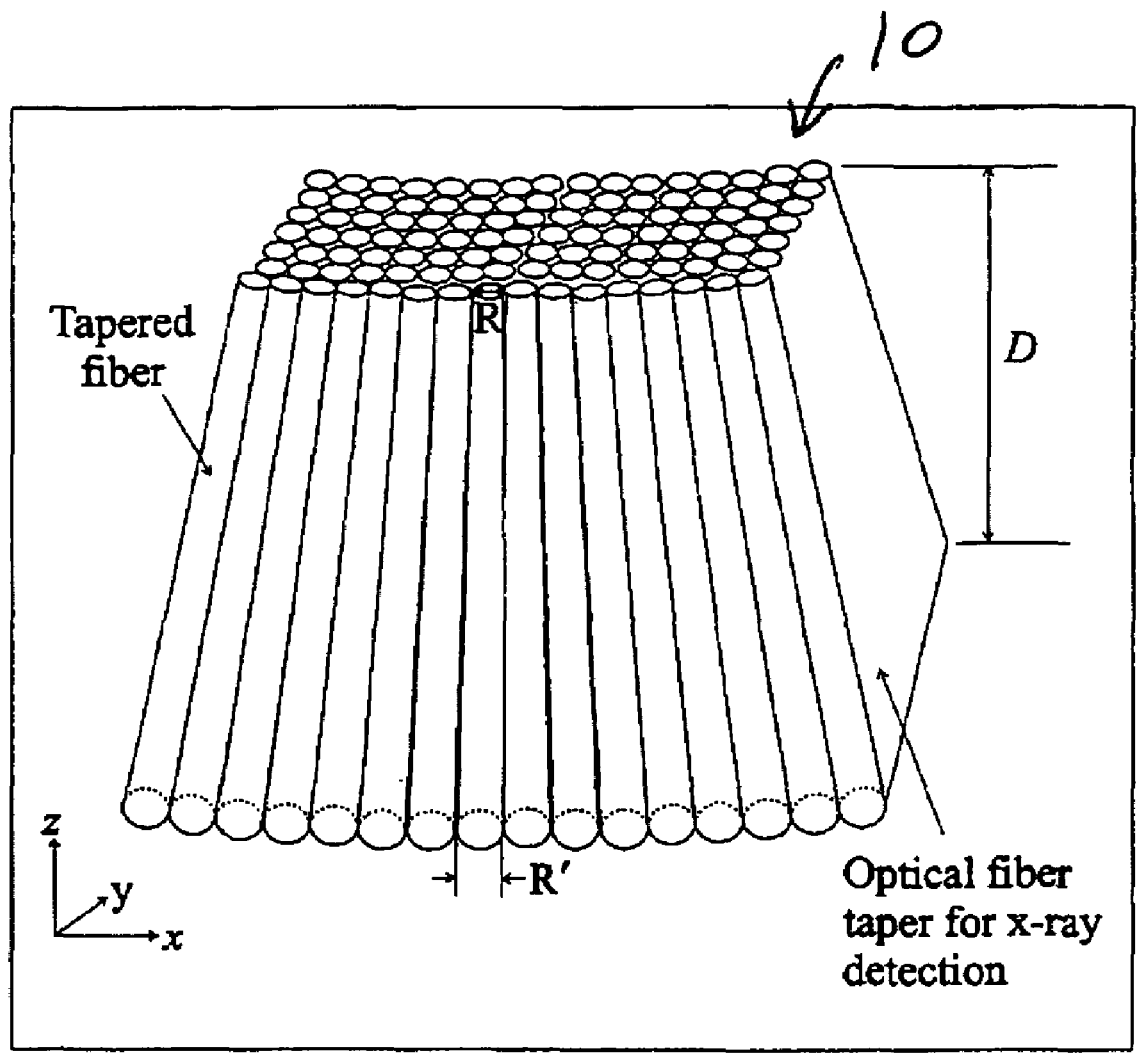
FIG. 3 shows a method of constructing the optical-fiber taper (OFT) using a large number of tapered optical fibers.

There can be some variations in the design of the optical fiber taper 10 described above. These variations include, but are not necessarily limited to: 1) the optical fibers in OFT can be tapered (see FIG. 3) thus permitting the use of a solid glass taper. 2) The core material in the optical fibers can be silica, plastic, or other transparent dielectric media. 4) The optical fibers can contain embedded black fibers or black cladding around the clear cladding glass to improve the absorption of light not guided by the fibers but that escapes from the sides of the fibers. However, the cladding layers should be as thin as possible to maintain a high fill factor, i.e., the percentage of the total area of the top surface of OFT occupied by the fiber cores. 5) The cladding layer can be air or materials with a close-to-unity refractive index to achieve a high numerical aperture. Thus, the fibers can be replaced with glass rods (with air gaps between the rods). 6) The epoxy resin filled in the air gap can be replaced with glass materials.

In operation, incident MV x-rays from x-ray source 22 interact with the taper 10 and generate Cerenkov light in the fibers 12 of the optical fiber taper 10. The light will be guided by the optical fibers 12 towards the optical image readout device 20. If an object or patient is placed between the x-ray source and the detector 30, the spatial distribution of light output from the optical fiber taper 10 represents an x-ray image of the object. The image can be read out either continuously (fluoroscopic mode) or discontinuously (radiographic mode). Once read out into a computer in digital form, the image can be processed and used, depending on the application.

The high quantum efficiency (QE) x-ray detector based on Cerenkov radiation (or Cerenkov light) for portal imaging disclosed herein may be used in several important applications. One such application is for treatment verification in radiation therapy. The goal of radiation therapy in treating patients with tumors is to accurately deliver a prescribed radiation dose to only the diseased tissues and spare the surrounding healthy tissues. Both the geometric and the dosimetric accuracy of radiation therapy treatments are crucial for their success. Currently, there are two methods to take an x-ray image of the patient (known as portal imaging) with the treatment beam (usually megavoltage x-rays) during, or immediately before, the treatment to verify the positional accuracy of treatment beams. One method is based on film; the other is based on EPIDs. The film method is awkward to use since film has to be developed before the patient's position can be checked. EPIDs on the other hand have rapid readout capabilities but most currently in use have poor image quality. Although recently developed flat panel detectors have been shown to have a much better image quality than conventional EPIDs, they are still inefficient in their utilization of x-rays due to their low quantum efficiency (QE). The device disclosed herein is much more efficient at using radiation and can be used to replace films or any previous developed EPID for treatment verification.

Another application for which the detector disclosed herein may be used is for transit dosimetry in radiation therapy. There are two types of treatment verification in radiation therapy: geometric and dosimetric. The first, geometric, concerns treatment setup and the second, dosimetric, is related to the delivered dose. Currently, there is a lack of convenient tools to immediately verify the dose delivered to the patient during radiation therapy treatments. EPIDs are potential tools for this application. To accomplish the dosimetric verification, an EPID detector would be in place during treatment and acquire treatment images. Once the treatment is completed, delivered iso-dose lines would be displayed and superimposed on the patient's anatomy within a few seconds. These would then be compared to the calculated iso-dose lines based on the planning system. However, one of the main challenges in using current EPIDs for this application is the fact that current EPIDs usually contain high atomic number materials, resulting in an over-response of the detectors to x-rays below ~1MeV, thus reducing the measurement accuracy (see, for example, S. Pistorius and B. McCurdy, "Exit Dosimetry: Quo vadis", *Canadian Medical Physics Newsletter,* 48, 120-125, October 2002). Therefore, the current invention can be useful, in particular, for this application since it is made of low-atomic number materials (such as silica), making transit dosimetry more accurate.

Another application for the detector disclosed herein is for machine quality assurance in radiation therapy. Linear accelerators that generate radiation for patient treatments require routine quality-assurance checks. Currently, there are various tools being used in the clinic for this purpose. EPIDs are potential tools that can be conveniently used for a rapid check on machine output and beam profiles. To accomplish this, flat field images (i.e., no patient or object between the detector and the x-ray source of the machine) would be obtained. The digital values of these images would be compared to the standard data (these pre-set for the machine) to check for any abnormal deviation. The current invention can be used for this application.

In yet another application the detector disclosed herein may be used for soft-tissue imaging using treatment beam in radiation therapy (Megavoltage cone beam CT). An important challenge in megavoltage x-ray imaging in radiation therapy is soft-tissue imaging. Cone-beam megavoltage computed tomography (MVCT) using a flat panel imager is a promising technique for soft tissue imaging. To accomplish this, a patient or an object is placed on a table around the isocenter of a linear accelerator, which is about half way between the x-ray source and a flat panel detector. The detector and the megavoltage x-ray source are then rotated simultaneously around the patient (by rotating the gantry), and a set of images is taken at different gantry angles, which leads to a set of CT images after reconstruction. However, with current flat panel systems, the dose required to achieve sufficient soft tissue contrast is prohibitively high due to its low QE. The current invention can, with its high QE, provide a solution to this problem.

The present invention may be used for other applications that involve a high-energy x-ray imaging task that requires a high efficiency for using radiation including for example non-destructive testing.

In conclusion, the present invention provides a new fiber optic based x-ray detector that uses Cerenkov radiation to convert x-ray energies into light for portal imaging application. Cerenkov radiation (or Cerenkov light) was discovered in 1926[see J. V. Jelley, *Cerenkov Radiation and its applications* (Pergamon Press, London 1958)]. It is an electromagnetic "shock-wave" of light produced by a charge particle (such as a fast electron generated by megavoltage x-rays interacting with a detector) passing through a dielectric medium with a velocity greater than the speed of light in the medium. Cerenkov radiation has found many applications in, e.g., Cerenkov counters for the studies of nuclear and cosmic ray physics since its discovery. However, it has not been applied to portal imaging.

The principal objective of the present invention is to provide a practical design of a megavoltage x-ray detector based on Cerenkov radiation, i.e., a Cerenkov detector for portal imaging application. In accordance with the present invention, the new design has a QE that can be more than 80% and yet has a spatial resolution equivalent to that of current EPIDs. The detective quantum efficiency (DQE) at the zero frequency can also be as high as 40%, which is over 20 times higher than that of current EPIDs. In addition, the detector according to the present invention is made of low-atomic number materials, a potential advantage for transit dosimetry in radiation therapy.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An x-ray detector, comprising:
  a) a plurality of optical light guides each having an optical core made of a dielectric material, each of the plurality of optical light guides having a length and opposed first and second ends, said plurality of optical light guides being aligned and bonded together along the length of said optical light guides to form an optical light guide taper with said optical light guides being bonded in such a way that the first ends of said plurality of optical light guides are aligned adjacent to each other to form a top surface, and the second ends of said plurality of optical light guides are aligned adjacent to each other to form a bottom surface, and each optical light guide in said optical light guide taper is aligned with an x-ray source spaced from said top surface in such a way that the optical light guide taper is tapered from said top surface to said bottom surface such that when located with respect to an x-ray source, each optical light guide is aligned with the x-ray source in such a way that x-rays entering a selected optical light guide at its first end can travel directly through said selected optical light guide towards the second end of said selected optical light guide; and
  b) optical image readout device optically coupled to said bottom surface, wherein x-rays entering said selected optical light guide which interact with the dielectric material by Compton scattering or pair-production processes produces energetic electrons having velocities greater than the speed of light in said dielectric material which produces Cerenkov light photons, and wherein Cerenkov light photons emitted in a forward direction in said selected optical light guide is guided by the selected optical light guide to said optical image readout device, and wherein a spatial variation of light output across the bottom surface produces an optical image which can be read out by the optical image readout device.

2. The detector according to claim 1 wherein said optical image readout device is an optical image intensifier.

3. The detector according to claim 1 wherein said optical image readout device is a silicon photomultiplier (SiPM).

4. The detector according to claim 1 wherein said optical image readout device is an a-Se based optical detector having an a-Se layer.

5. The detector according to claim 4 wherein said a-Se based optical detector having an a-Se layer is operated in an avalanche mode to amplify electrical signals produced by light photons incident on the detector.

6. The detector according to claim 1 wherein said optical image readout device is an optically sensitive 2D active readout matrix.

7. The detector according to claim 6 wherein said optically sensitive 2D active readout matrix is operated in an avalanche mode.

8. The detector according to claim 1 wherein said optical light guide taper has length and width dimensions of about ~40 cm×40 cm, and a thickness in a range from about 1 cm to at least about 40 cm.

9. The detector according to claim 1 wherein said first ends of said plurality of optical light guides aligned adjacent to each other to form said top surface have a reflective coating applied thereto so that Cerenkov light photons emitted in a backward direction in said optical light guides toward said x-ray source are reflected back towards the optical image readout device.

10. The detector according to claim 1 wherein gaps between said optical light guides in said optical light guide taper are filled in with a pre-selected material.

11. The detector according to claim 1 wherein said optical light guides have a first outer diameter R at said top surface and a second outer diameter R' at said bottom surface larger than said first outer diameter R so that said optical light guide taper is formed when said optical light guides are bonded together.

12. The detector according to claim 11 wherein R is in a range from about 1 μm to about 10000 μm.

13. The detector according to claim 11 wherein a ratio of R to R' is given by $$R/R' = SSD/(SSD+D) \quad (1).$$

wherein SSD is a source-to-detector-surface distance and D is a detector thickness.

14. The detector according to claim 10 wherein said pre-selected material is black epoxy resin or glass to improve absorption of light not guided by the optical light guides but that escapes from the sides of the optical light guides.

15. The detector according to claim 1 wherein said optical light guides are optical fibers having a cladding layer surrounding said optical cores.

16. The detector according to claim 1 wherein said optical light guides are glass rods, wherein a cladding layer around each glass rod is air.

17. The detector according to claim 15 wherein said optical cores are made from a material selected from the group consisting of silica, plastic and transparent dielectric media.

18. The detector according to claim 15 wherein said optical fibers are coated with an extra thin layer of light absorption material to improve the absorption of light not guided by the optical fibers but that escapes from the sides of the optical fibers.

* * * * *